US011528320B1

(12) United States Patent
Paralikar

(10) Patent No.: US 11,528,320 B1
(45) Date of Patent: Dec. 13, 2022

(54) SYSTEMS AND METHODS FOR END USER CONNECTION LOAD BALANCING

(71) Applicant: Citrix Systems, Inc., Fort Lauderdale, FL (US)

(72) Inventor: Hrushikesh Shrinivas Paralikar, Milpitas, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 17/404,093

(22) Filed: Aug. 17, 2021

(51) Int. Cl.
*H04L 67/1001* (2022.01)
*H04L 67/101* (2022.01)
*H04L 43/0888* (2022.01)
*H04L 61/103* (2022.01)
*H04L 61/4511* (2022.01)
*H04L 67/562* (2022.01)
*H04L 67/1029* (2022.01)
*H04L 67/1036* (2022.01)

(52) U.S. Cl.
CPC ...... *H04L 67/1001* (2022.05); *H04L 43/0888* (2013.01); *H04L 61/103* (2013.01); *H04L 61/4511* (2022.05); *H04L 67/101* (2013.01); *H04L 67/1029* (2013.01); *H04L 67/1036* (2013.01); *H04L 67/562* (2022.05)

(58) Field of Classification Search
CPC ............ H04L 67/1002; H04L 67/1029; H04L 67/1036
See application file for complete search history.

(56) References Cited

U.S. PATENT DOCUMENTS

2011/0153840 A1* 6/2011 Narayana ............ H04L 67/1002
709/227

* cited by examiner

*Primary Examiner* — Kyung H Shin
(74) *Attorney, Agent, or Firm* — Foley & Lardner LLP

(57) ABSTRACT

Described herein are systems and methods for end user connection load balancing amongst multiple on-premise connector proxies deployed across geographic locations and reducing connection setup latency without using a shared or distributed database. The system can load balance connections deterministically amongst the on-premise connector proxies using load statistics. The system utilizes an intelligent DNS service that can use network experience data, service availability, and application metrics to provide sophisticated traffic management via DNS or API-based decisions. The system can include a domain name system (DNS) resolver configured to receive metrics for a first connector and a second connector of a data center of an entity, receive a DNS request including an entity identifier and a data center identifier; and transmit a response to the DNS request identifying a server selected based on the metrics identified using the entity identifier and the data center identifier.

20 Claims, 9 Drawing Sheets

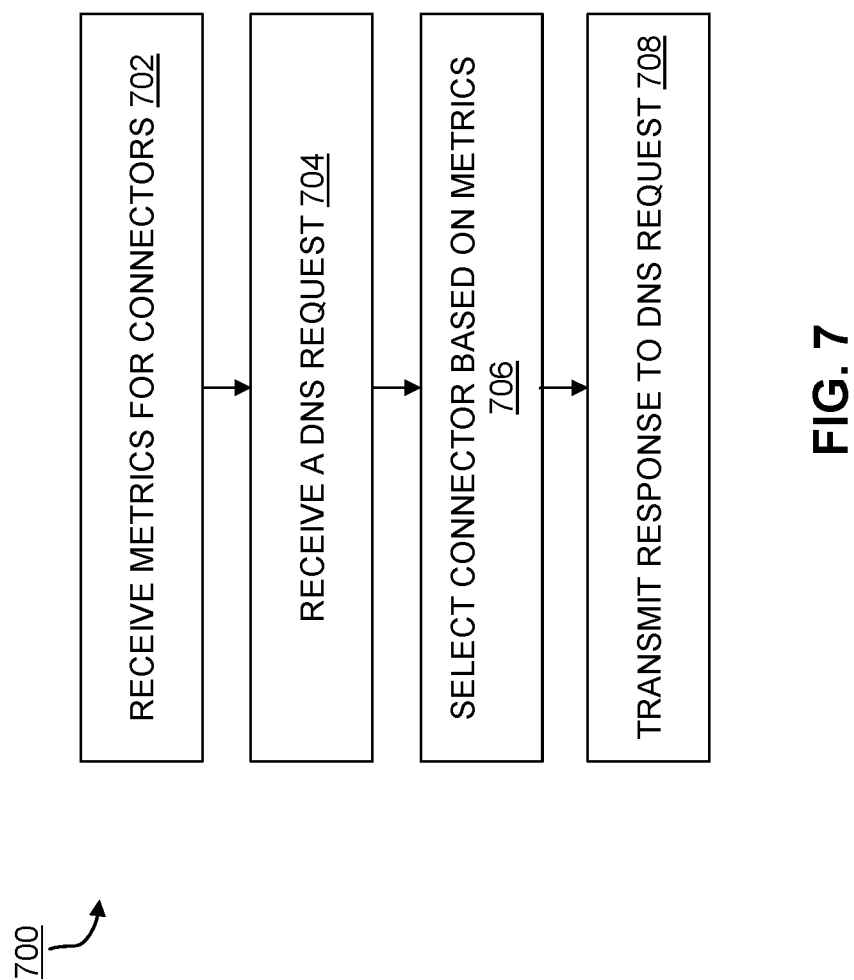

SYSTEMS AND METHODS FOR END USER CONNECTION LOAD BALANCING

FIELD OF THE DISCLOSURE

The present application generally relates to load balancing, including but not limited to systems and methods for end user connection load balancing amongst multiple on-premise connector proxies deployed across various geographic locations and reducing connection setup latency.

BACKGROUND

Clients or processing engines can submit queries to access domains corresponding to resources hosted on servers, but load balancing the requests across the servers is difficult.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for end user connection load balancing are described herein. In particular, the systems and methods described herein relate to end user connection load balancing amongst multiple on-premise connector proxies deployed across geographical locations and reducing connection setup latency without using a shared or distributed database. The systems and methods described herein can use metrics to select a server for a client that submitted a domain name service or system (DNS) request. The systems and methods described herein can also be used for selecting and load balancing and tunneling any protocol traffic to any such on-premise proxies. For example, the systems and methods described herein can rely on an intelligent DNS service to form half of a distributed and highly available two-tier load-distribution system. The DNS resolver can provide data-feeds to the DNS or a global server load balancing (GSLB) system, and implement logic to determine the DNS response. For example, the systems and methods described herein can relate to a delivery network architecture, such as CITRIX GATEWAY.

In a geographically distributed point of presence (PoP) cloud service, the subscribing customers (for example, an enterprise) can have an on-premise component (e.g., connector) that acts as the proxy between the firewall protected enterprise resources and the PoP. This component can register to the PoP closest to its geolocation based on network latencies.

Once the component registers, the component can periodically send some messages on the connection as a ping (for instance, a 'keepalive') as an indication to keep the connection alive as well as for detection of a connection status from the application level.

The components (e.g., connectors) can include some load information in the 'keepalives' as well. This information can include data such as live connection count or current throughput. This information can be the data that would be considered or used for selecting the connectors.

There can be multiple connectors for a data center (as also referred to as a resource location) and the multiple connectors can be registered with different PoPs.

When the user logs in and tries to launch the application, there are intermediary entities, such as a broker, that can communicate with the data PoP in the background to generate a configuration file. This configuration file can include the data PoP's fully qualified domain name (FQDN) to which the user traffic can be routed to and is consumed by the client on the user side. As part of constructing this configuration file, the broker can connect to any data PoP to fetch the FQDN of the data PoP to route this user connection to and provides the customer name and the resource location of the connector proxy in this request.

For such a request from the broker, the data PoP can return a customer and resource location specific FQDN instead of a global FQDN such as "customername-resourcelocationuiid-global.g.nssvc.net."

The DNS resolver can use network experience data, service availability, and application metrics to provide sophisticated traffic management via DNS or API-based decisions. For example, the DNS resolver can be CITRIX ITM. The DNS resolver can be configured with all the PoPs as platforms with feeds. These feeds can be endpoints that are used to accept some data that can be used to make DNS resolution decisions.

The data PoPs can send the connector registration information for every registration/deregistration. The data PoPs can send this registration information periodically in a JSON format. This information can include the list of connectors with their customer names and resource locations and the corresponding load statistics.

The DNS resolver can be configured with an algorithm to take in the feed data as a parameter to resolve the DNS. For every DNS resolution request from the end user for the global endpoint (e.g., global.g.nssvc.net), the DNS resolver can determine the least loaded connector based on the feed data. The least loaded connector can be defined as the one with least throughput, or in the case of equal throughput, the least number of connections. In some embodiments, the DNS resolver can also select the connector based on a weighted average of the load parameters.

Based on the feed data, the DNS resolver can have a global view that can include the data for all the connectors and to which PoP they are currently registered.

When the DNS resolution attempts for this FQDN is made, the DNS resolver with the above-mentioned configured algorithm can use the customer name and resource location in the FQDN to determine which PoPs the connectors are registered to and which one of them is the least loaded.

Based on this information, the DNS resolver can resolve this FQDN with the PoP-specific FQDN where the connector is registered for the user such as "az-us-e-global.g.nsvc.net. The user traffic would be directed to the PoP at which the least loaded connector is registered. For example, if connector 1 is least loaded, the returned FQDN would be for PoP A since connector 1 is registered to PoP A. For example, the returned FQDN can be "-popa-global.g.nssvc.net".

Once the user connection connects to the PoP, the DNS resolver can select the least loaded connector from the registered connectors with the same algorithm on the data PoP and prevent imbalance amongst the connectors.

The connector can be located at a DNS resolution time, and the user traffic can be routed there. This routing can reduce the connection setup latency by eliminating data usage between PoPs.

In one aspect, this disclosure is directed to a method. The method includes receiving, by a domain name system (DNS) resolver, metrics for a first connector and a second connector of a data center of an entity. The method includes receiving, by the DNS resolver, from a client, a DNS request including an entity identifier and a data center identifier. The method includes transmitting, by the DNS resolver to the client, a response to the request identifying a server selected based on the metrics identified using the entity identifier and the data center identifier.

In some embodiments, the method further includes selecting, by the DNS resolver, from the first connector or the second connector, a connector based on the first set of metrics and the second set of metrics. In some embodiments, the DNS resolver selects the server based on the selected connector coupled to the selected server. In some embodiments, the first connector is one of a plurality of first connectors coupled to a first server. In some embodiments, the method further includes receiving, by the DNS resolver from the first server, a respective set of metrics of the plurality of first connectors. In some embodiments, the first connector establishes a connection with the selected server based on at least one of the respective set of metrics for the plurality of first connectors. In some embodiments, selecting the connector further includes identifying, by the DNS resolver, a first throughput of the first connector and a second throughput of the second connector. In some embodiments, the selecting the connector further includes identifying, by the DNS resolver, a first count of connections for the first connector and a second count of connections for the second connector. In some embodiments, the selecting the connector further includes selecting the connector from the first connector and the second connector based on the first throughput and the second throughput, or the first count and the second count.

In some embodiments, the entity identifier and the data center identifier are received by the client responsive to the client requesting access to a resource hosted on the first server and the second server. In some embodiments, the method further includes identifying, by the DNS resolver, the first connector and the second connector of the entity using the entity identifier from the DNS request. In some embodiments, the first connector serves as a proxy between the first server and resources of the entity, and wherein the second connector serves as a proxy between the second server and the resources of the entity. In some embodiments, the first connector is configured to transmit a plurality of messages to maintain a connection with the first server, the plurality of messages including data corresponding to the first set of metrics of the first connector. In some embodiments, the data corresponding to the first set of metrics of the first connector includes a first throughput of the first connector or a first count of connections. In some embodiments, the method further includes maintaining, by the DNS resolver, for the first server and the second server, a list of connectors coupled to the first server or the second server, the list including entity identifiers, data center identifiers and metrics corresponding to the list of connectors.

In another aspect, this disclosure is directed to a system. The system includes a domain name system (DNS) resolver. The DNS resolver is configured to receive metrics for a first connector and a second connector of a data center of an entity. The DNS resolver is configured to receive, from a client, a DNS request including an entity identifier and a data center identifier. The DNS resolver is configured to transmit, to the client, a response to the request identifying a server selected based on the metrics identified using the entity identifier and the data center identifier.

In some embodiments, the DNS resolver is further configured to select, from the first connector or the second connector, a connector based on the first set of metrics and the second metrics. In some embodiments, the DNS resolver selects the server based on the selected connector coupled to the selected server. In some embodiments, the first connector is one of a plurality of first connectors coupled to the first server. In some embodiments, the DNS resolver is further configured to receive, from the first server, a respective set of metrics of the plurality of first connectors. In some embodiments, the first connector establishes a connection with the selected server based on at least one of the respective set of metrics for the plurality of first connectors. In some embodiments, selecting the connector includes identifying a first throughput of the first connector and a second throughput of the second connector. In some embodiments, selecting the connector includes identifying a first count of connections for the first connector and a second count of connections for the second connector. In some embodiments, selecting the connector includes selecting the connector from the first connector and the second connector based on the first throughput and the second throughput, or the first count and the second count.

In some embodiments, the entity identifier and the data center identifier are received by the client responsive to the client requesting access to a resource hosted on the first server and the second server. In some embodiments, the DNS resolver is further configured to identify the first connector and the second connector of the entity using the entity identifier from the DNS request. In some embodiments, the first connector serves as a proxy between the first server and resources of the entity. In some embodiments, the second connector serves as a proxy between the second server and the resources of the entity. In some embodiments, the first connector is configured to transmit a plurality of messages to maintain a connection with the first server, the plurality of messages including data corresponding to the first set of metrics of the first connector, wherein the data corresponding to the first set of metrics of the first connector includes a first throughput of the first connector or a first count of connections. In some embodiments, the DNS resolver is further configured to maintain, for the first server and the second server, a list of connectors coupled to the first server or the second server, the list including entity identifiers, data center identifiers and metrics corresponding to the list of connectors.

In one aspect, this disclosure is directed to a non-transitory computer-readable medium storing instructions that, when executed by one or more processors, cause the one or more processors to receive metrics for a first connector and a second connector of a data center of an entity. The one or more processors can receive, from a client, a domain name system (DNS) request including an entity identifier and a data center identifier. The one or more processors can transmit, to the client, a response to the request identifying a server selected based on the metrics identified using the entity identifier and the data center identifier.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith:

FIG. 7 is a flow diagram of a method for end user connection load balancing, in accordance with one or more embodiments.

DETAILED DESCRIPTION

Figure 1A:
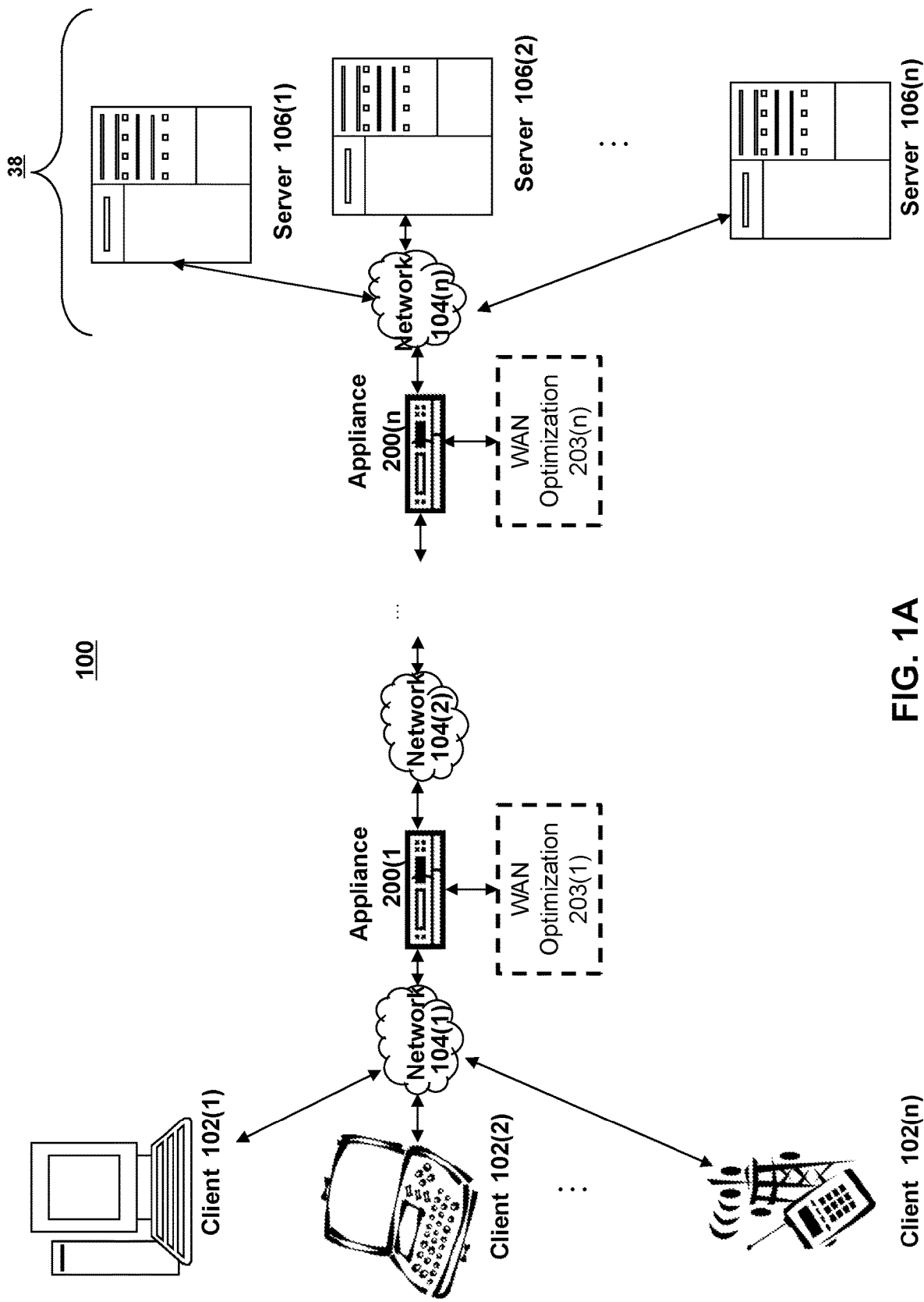
FIG. 1A is a block diagram of a network computing system, in accordance with one or more embodiments.

For a cloud service serving enterprise application traffic from on-premise connectors via geographically distributed PoPs, it can be beneficial to balance the traffic load across the PoPs and the connectors.

Customers can deploy multiple such connectors to load balance the end user connections to the data center hosting the applications. The connectors can be optimized and can include control channels established only with one PoP that is closest to the connectors. A best effort mechanism to locate and select the connector might not be based on any load statistics of the connector, and instead can just be configured to establish a connection established with the closest connector proxy as fast as possible. Hence, when end users connect from other geographic locations, there might be a lot of control traffic within the PoPs for determining which of the PoPs have the desired connector. Once the connector is located, network components can be configured to establish a connection with the PoP at which the end user connection is waiting. This process would be time consuming if there were a large number of such PoPs and the end users are connecting from geographic locations than the connector proxy. Moreover, this approach could cause a load imbalance on the connectors since only a few of them would be handling the load while the other ones are idle. Such situations can cause slow processing of user traffic on the loaded connectors, and sufficiently high load can cause the loaded connectors to restart, which results in disruption in the application delivery to the end user.

For example, a non-deterministic approach for selecting connectors and load balancing would not share state across the PoPs. If the connectors register with their closest PoP and the users connect to their closest PoPs, there would be a situation where the user connections and connector registrations are happening at different geographic locations. Since there is no shared state, the PoP where the user connection was established can broadcast messages to look up the connectors across the other PoPs. In this approach, all the other PoPs look up the connector and request the connector to establish the connection, which results in a large connection setup time and suboptimal load balancing since only the first connector to establish the connection gets selected.

The systems and methods described herein are can load balance the data connections deterministically amongst the connectors by using load statistics of the connectors without using a shared or distributed database. By reducing inter-PoP communication, connection setup latency can be reduced. Accordingly, the systems and methods described herein relate to end user connection load balancing amongst multiple on-premise connector proxies deployed across geographical locations and reducing connection setup latency without using a shared or distributed database.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment;

Section E describes embodiments of systems and methods for end user connection load balancing; and Section F describes various example embodiments of the systems and methods described herein.

A. NETWORK AND COMPUTING ENVIRONMENT

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104(n) (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc., of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc., of Fort Lauderdale, Fla.

Figure 1B:
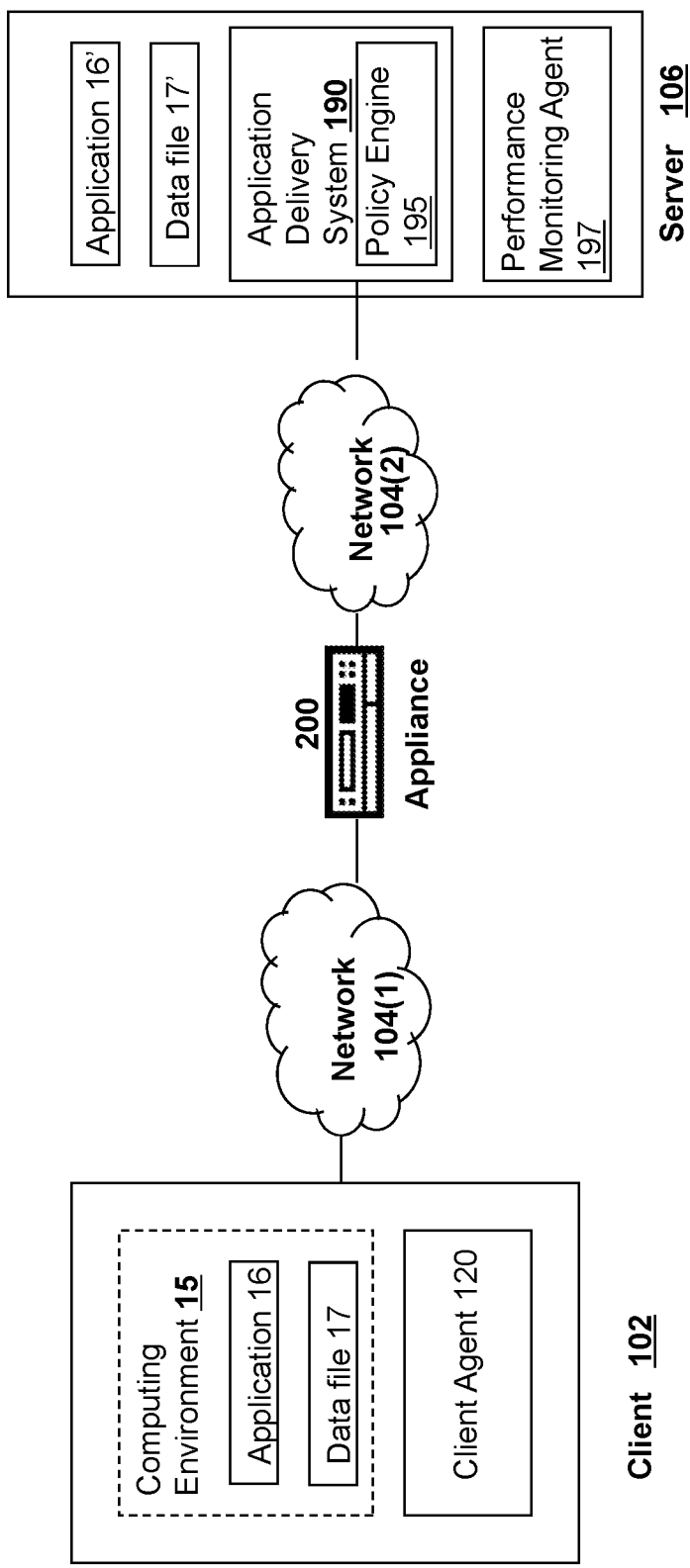
FIG. 1B is a block diagram of a network computing system for delivering a computing environment from a server to a client via an appliance, in accordance with one or more embodiments.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include a client agent 120 and computing environment 15. Computing environment 15 may execute or operate an application 16 that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example, by the application delivery system 190. For example, appliance 200 may accelerate delivery of a streaming application and data file executable by the application from a data center to a remote user location by accelerating transport layer traffic between a client 102 and a server 106. Such acceleration may be provided by one or more techniques, such as 1) transport layer connection pooling, 2) transport layer connection multiplexing, 3) transport control protocol buffering, 4) compression, 5) caching, or 6) other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example, via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming, or delivering the application locally to the client 120 for local execution.

For example, in operation, a client 102 may request execution of an application (e.g., application 16'), and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc., of Fort Lauderdale, Fla. The application may be any application related to real-time data communications, such as applications for streaming graphics, streaming video and/or audio or other data, delivery of remote desktops or workspaces or hosted services or applications, for example, infrastructure as a service (IaaS), desktop as a service (DaaS), workspace as a service (WaaS), software as a service (SaaS) or platform as a service (PaaS).

One or more of servers 106 may include a performance monitoring service or performance-monitoring agent 197. In some embodiments, a dedicated one or more servers 106 may be employed to perform performance monitoring. Performance monitoring may be performed using data collection, aggregation, analysis, management and reporting, for example, by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc., of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example, periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106, and/or appliances 200 and 205 may each correspond to one computer, a plurality of computers, or a network of distributed computers such as computer 101 shown in FIG. 1C.

Figure 1C:
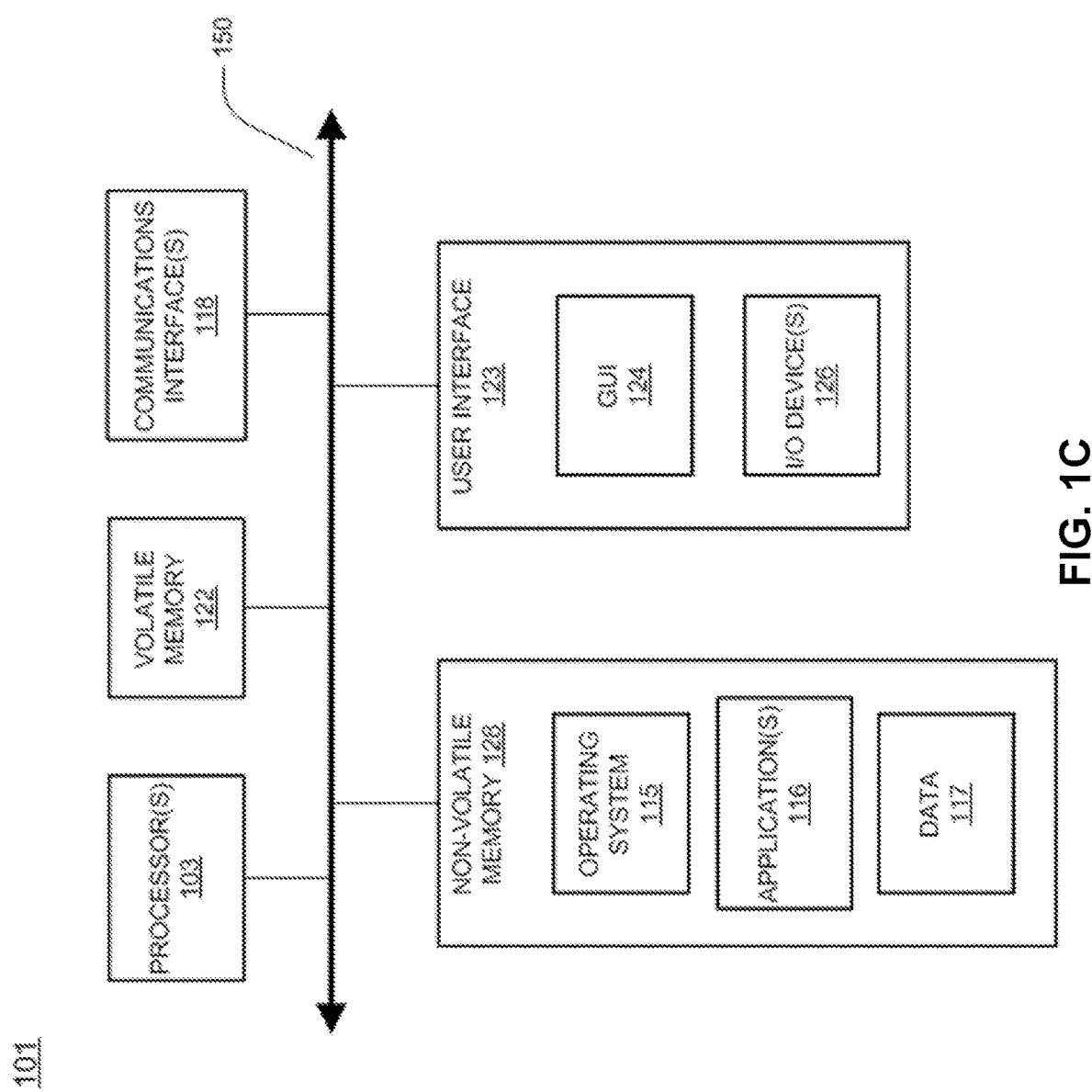
FIG. 1C is a block diagram of a computing device, in accordance with one or more embodiments.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. APPLIANCE ARCHITECTURE

Figure 2:
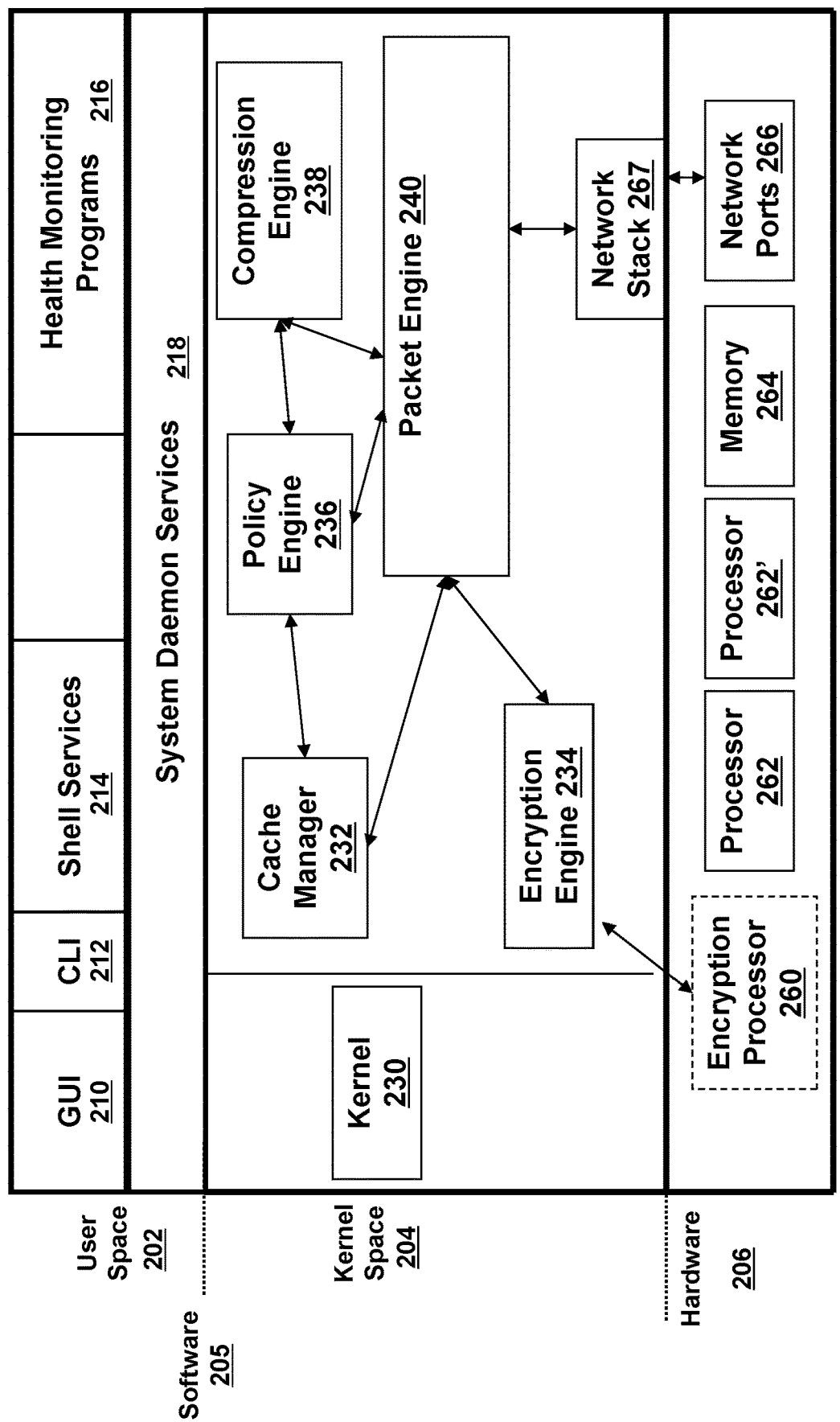
FIG. 2 is a block diagram of an appliance for processing communications between a client and a server, in accordance with one or more embodiments.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions, or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236, and compression engine 238. In other words, one or more of processes 232, 240, 234, 236 and 238 run in the core address space of the operating system of appliance 200, which may reduce the number of data transactions to and from the memory and/or context switches between kernel mode and user mode, for example, since data obtained in kernel mode may not need to be passed or copied to a user process, thread or user level data structure.

Cache manager 232 may duplicate original data stored elsewhere or data previously computed, generated, or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example, between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example, to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes, or executable instructions to support interaction with appliance 200 by a user via the GUI 210 and/or CLI 212.

Health monitor 216 monitors, checks, reports and ensures that network systems are functioning properly and that users are receiving requested content over a network, for example, by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example, to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc., of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 can identify and determine one or more client-side attributes, such as the operating system and/or a version of an operating system, a service pack of the operating system, a running service, a running process, a file, presence, or versions of various applications of the client, such as antivirus, firewall, security, and/or other software.

C. SYSTEMS AND METHODS FOR VIRTUALIZING AN APPLICATION DELIVERY CONTROLLER

Figure 3:
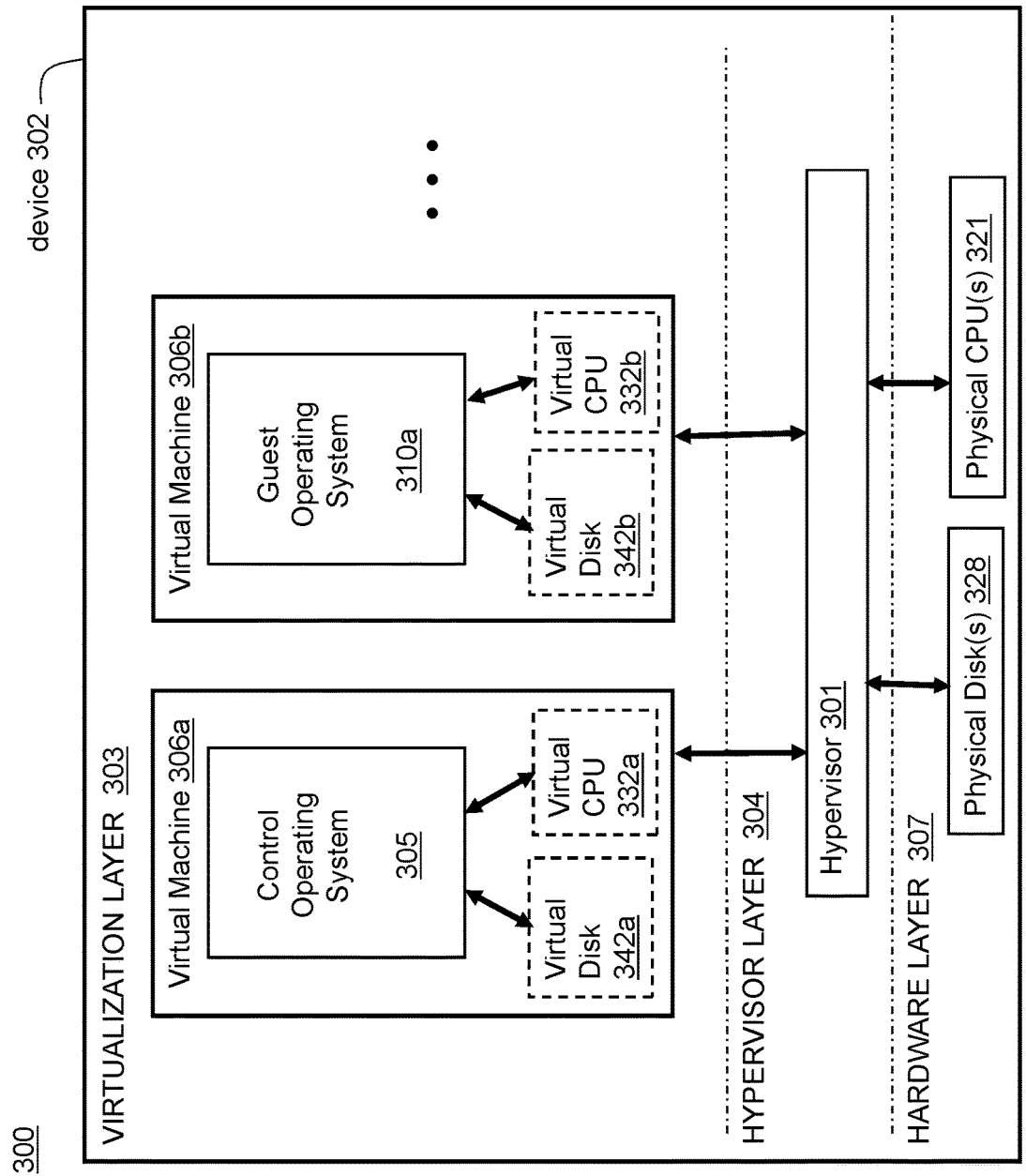
FIG. 3 is a block diagram of a virtualization environment, in accordance with one or more embodiments.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc., of Fort Lauderdale, Fla. In an illustrative embodiment, device 302 executing a hypervisor that creates a virtual machine platform on which guest operating systems may execute is referred to as a host server 302.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example, by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106, or appliance 200. Virtual appliances may provide functionality for availability, performance, health monitoring, caching and compression, connection multiplexing and pooling and/or security processing (e.g., firewall, VPN, encryption/decryption, etc.), similarly as described about appliance 200.

In some embodiments, a server may execute multiple virtual machines 306, for example, on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example, to balance the flows across the cores. For example, packet distribution may be based upon determinations of functions performed by each core, source and destination addresses, and/or whether a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field, or payload of network packet, and include any tuples of information associated with a network packet or data flow, such as addresses and ports. The hash result or any portion thereof may be used to identify a processor, core, engine, etc., for distributing a network packet, for example, via a hash table, indirection table, or other mapping technique.

D. SYSTEMS AND METHODS FOR PROVIDING A DISTRIBUTED CLUSTER ARCHITECTURE

Figure 4:
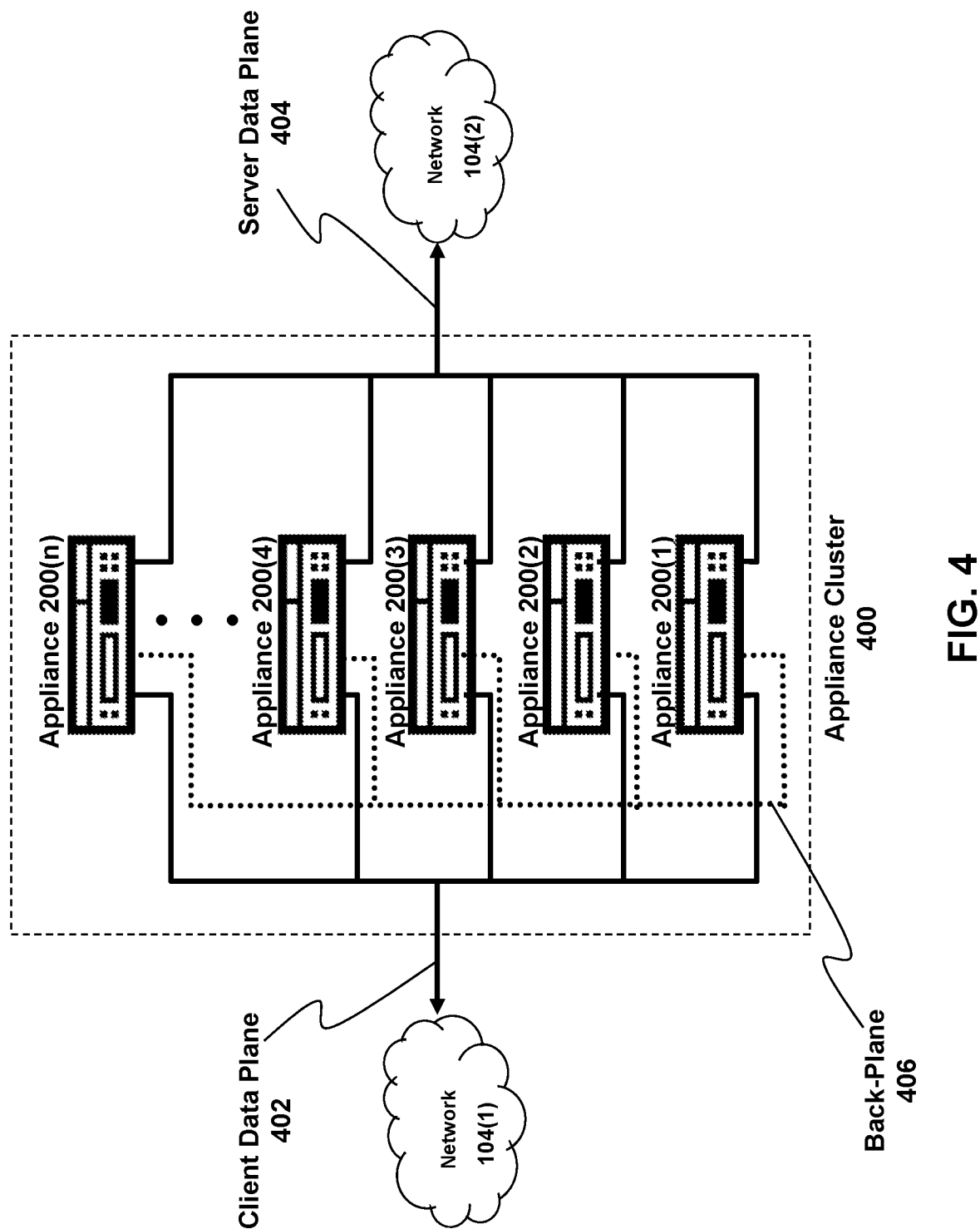
FIG. 4 is a block diagram of a cluster system, in accordance with one or more embodiments.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example, to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly, to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back-plane 406. Back-plane 406 may enable inter-node or inter-appliance control and configuration messages, for inter-node forwarding of traffic, and/or for communicating configuration and control traffic from an administrator or user to cluster 400. In some embodiments, back-plane 406 may be a physical network, a VPN or tunnel, or a combination thereof.

E. SYSTEMS AND METHODS FOR END USER CONNECTION LOAD BALANCING

Balancing end user data connections can rely on resource intensive shared or distributed databases in a geographically distributed cloud service. In particular, the systems and methods described herein relate to end user connection load balancing amongst multiple on-premise connector proxies deployed across geographical locations and reducing connection setup latency without using a shared or distributed database. The systems and methods described herein can load balance the end user data connections deterministically amongst the on-premise connector proxies by using load statistics. Balancing deterministically can reduce the data connection setup latency by reducing inter PoP communication, and avoids the introduction of a new component (e.g., a shared database) for global load distribution. Moreover, avoiding shared or distributed databases reduces security risk (e.g., reduces vulnerable points in the network). The systems and methods described herein can utilize an intelligent DNS service (e.g., CITRIX ITM) that can use network experience data, service availability, and application metrics to provide sophisticated traffic management via DNS or API-based decisions. The DNS service can be a half of a distributed and highly available two-tier load-distribution system, which can reduce the connection setup latency caused by chatty protocols to communicate state between globally distributed PoPs.

In addition to the benefits identified above with respect to the present disclosure, the systems and methods described herein further reduce the latency for launching applications and reducing the amount of traffic exchanged between PoPs when trying to service a new user connection. In particular, in certain existing solutions, when a user attempts to connect to an application via a PoP that has no connectors to the application, the PoP may not be able to service the connection and may need to identify another PoP that does have a connection with a connector coupled to the application. In such situations, the PoP that does not have a suitable connector lacks a global view of all the other connectors connected to other PoPs and therefore, transmits one or more broadcast messages to the remaining PoPs to identify suitable connectors to service the connection request between the client and the application. The other PoPs that do have suitable connectors then have to connect back with the PoP at which the user connection is waiting. This results in the exchange of various messages, and depending on the number of PoPs, can result in a large number of messages exchanged between the PoPs and results in a slower launch process where the PoPs have to wait for the broadcast and then one of the other PoPs identifies the suitable connector before establishing the connection.

Moreover, the systems and methods described herein can address certain deficiencies in existing load balancing solutions. In particular, in situations where all of the connections to the application are serviced by a first PoP, the first connector between the application and the first PoP services all of the connections, while all the other connectors established between the application and other PoPs remain idle or underutilized. As a result, there may be a degradation in performance provided by the first connector due to being overloaded even though the remaining connectors are underutilized. By way of the present disclosure, the DNS resolver, by collecting load information of each connector via one or more servers of each PoP, the DNS resolver can intelligently resolve a DNS resolution request to avoid overloading one connector if other underutilized connectors are available.

Figure 5:
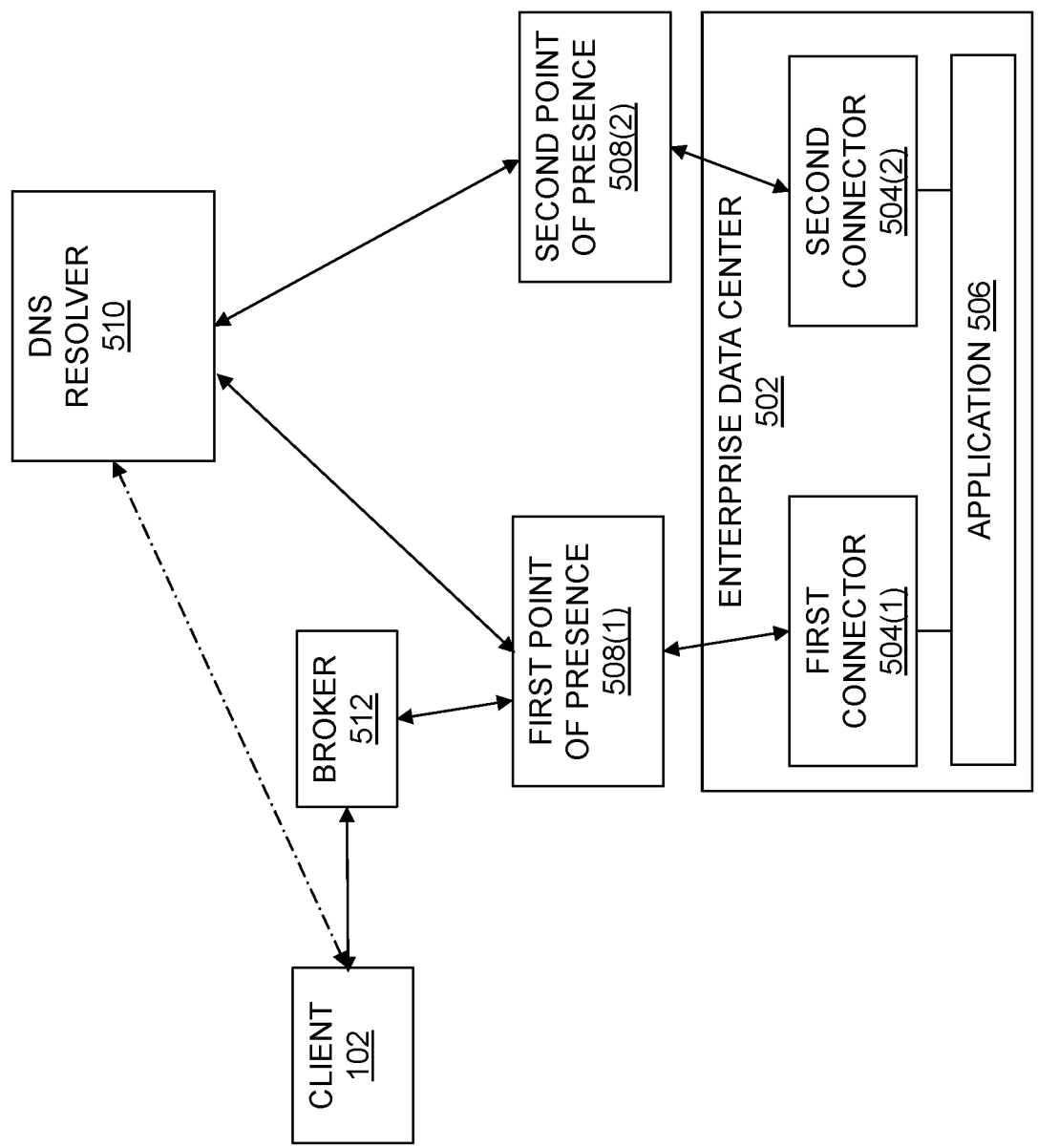
FIG. 5 is a block diagram of a system for end user connection load balancing, in accordance with one or more embodiments.

Referring now to FIG. 5, FIG. 5 is a block diagram of an environment 500 for end user connection load balancing, in accordance with one or more embodiments. In brief overview, the environment 500 can include a client 102 and an enterprise data center 502, which includes a first connector 504(1), a second connector 504(2), and an application 506. The environment 500 further includes a first point of presence (PoP) 508(1), a second PoP 508(2), a DNS resolver 510, and a broker 512. The client 102 can be communicatively coupled to the DNS resolver 510 and the broker 512. The first connector 504(1) can be communicatively coupled to the application 506 and the first PoP 508(1). The second connector 504(2) can be communicatively coupled to the application 506 and the second PoP 508(2). The first PoP 508(1) can be communicatively coupled to the first connector 504(1), the DNS resolver 510, and the broker 512. The second PoP 508(2) can be communicatively coupled to the second connector 504(2), the DNS resolver 510, and the broker 512. Although FIG. 5 only shows two connectors 504 and two PoPs 508, it should be appreciated that the environment 500 can include any number of connectors 504 and PoPs 508.

As described in detail below, the connectors 504 can be configured to connect with respective PoPs 508. The DNS resolver 510 can be configured to identify the connections between the connectors 504 and the PoPs 508, as well as receive metrics of the connectors 504. When the client 102 requests access to the application 506, the DNS resolver 510 can be configured to use the identified connections and received metrics to resolve the DNS request by selecting from one of the PoPs 508 via which the client 102 can connect to one of the connectors 504 that can be configured to provide the application 506. For example, if the DNS resolver 510 selects the first PoP 508(1), the client 102 can connect to the first PoP 508(1), which can be configured to route the client 102 to the first connector 504(1) to access the application 506.

The client 102, the enterprise data center 502 (including the first connector 504(1), the second connector 504(2), and the application 506, the first point of presence PoP 508(1), the second PoP 508(2), the DNS resolver 510, and the broker 512 can be implemented using components described in connection with FIGS. 1-4.

Each of the above-mentioned elements or entities is implemented in hardware, or a combination of hardware and software, in one or more embodiments. Each component of the environment 500 can be implemented using hardware or a combination of hardware or software detailed above in connection with FIGS. 1-4. Each of these elements or entities can include any application, program, library, script, task, service, process or any type and form of executable instructions executing on hardware of the various components in the environment 500. The hardware includes circuitry such as one or more processors in one or more embodiments.

The enterprise data center 502 can be configured to provide services or resources to clients 102. The enterprise data center 502 can belong to an entity, such as a customer of a service or cloud provider. For example, the first and second connectors 504 can be included in the enterprise data center 502.

The first connector 504(1) and the second connector 504(2) of the enterprise data center 502 can be configured to be an intermediary via which the client 102 can access the application 506 of the enterprise data center 502. The connectors 504 can provide the client 102 access to the application 506. The connectors 504 can be software executing on premises of the enterprise data center 502. In some embodiments, a connector, such as the connector 504(1) or 504(2) can be configured to execute in a hypervisor in the customer's private network.

The application 506 of the enterprise data center 502 can be configured to be a service accessible to the client 102. The application 506 can be configured to receive requests from clients via one or more connectors, such as the first connector 504(1) or the second connector 504(2). The application can be a web application or other application executing in the enterprise data center 506.

The first PoP 508(1) and the second PoP 508(2) of the enterprise data center 502 can be configured to be an intermediary, interface, or access point between the connectors 504 and the client 102. A PoP is a deployment in the cloud where the cloud service provider may have some or all of their micro services running in a specific location or a private cluster in any cloud platform that has been deployed to serve the purpose of the service or in some embodiments, an application. The PoPs 508 can be configured to be or include servers, routers, network switches, multiplexers, and other network interface equipment. The PoPs 508 can be configured to receive a plurality of messages to maintain a connection with the connectors 504. The plurality of messages can include data corresponding to metrics of the connectors 504. For example, the data corresponding to a set of metrics can include a throughput of the connector 504 or a count of connections.

The DNS resolver 510 can be configured to maintain or manage the PoPs 508. In particular, the DNS resolver 510 can be configured to maintain or collect traffic related data corresponding to each of the PoPs 508 and use the traffic related data to select the PoP to which to route traffic to and as a result, manage the flow of traffic to various PoPs. The DNS resolver 510 can be configured to be a network traffic optimizer that monitors the connectors 504 and the PoPs 508 for optimally routing the client 102 to access the application 506. The DNS resolver 510 can be configured to maintain a list of connectors 504 coupled to the PoPs 508. To maintain the list, the DNS resolver 510 can be configured to receive registration information from the PoPs 508. The registration information includes information about the PoPs 508 and the connectors 504 to which they are connected. Using the registration information, the DNS resolver 510 can be configured to register the connectors 504 and the PoPs 508. The list can include entity identifiers, data center identifiers, and metrics corresponding to the list of connectors 504.

The DNS resolver 510 can be configured to receive metrics of the connectors 504. For example, the DNS resolver 510 can receive metrics for the first connector 504(1) and the second connector 504(2). The DNS resolver 510 can be configured to receive the metrics from the PoPs 508, which can be configured to receive the metrics in the messages from the connectors 504. Based on the metrics, the DNS resolver 510 can be configured to identify or determine throughput of the connectors 504. In another example, based on the metrics, the DNS resolver 510 can be configured to identify or determine a count of connections for the connectors 504. In some embodiments, each PoP can be configured to receive keepalive messages from a single connector that includes the load information about the specific connector. The DNS resolver 510 can therefore receive the load information for each connector from the PoP to which the connector is maintaining a connection. The DNS resolver 510 can then maintain, for each connector, load information that it can then use for DNS resolution. In some embodiments, the PoP can include one or more servers that are configured to transmit the load information about the connectors to the DNS resolver 510. Examples of the metrics of the connectors include number of connections, CPU usage, throughput, and latency metrics, among others.

The DNS resolver 510 can be configured to receive a DNS resolution request. The DNS resolution request can include an entity identifier (for example, a customer identifier) and a data center identifier identifying a data center. The DNS resolver 510 can receive the DNS request from the client 102. The entity identifier and the data center identifier can be obtained by the client from one or more servers of a PoP as described herein. For example, the DNS resolver 510 can receive the DNS request from the client 102 that received the entity identifier and the data center identifier after requesting access to the application 506 hosted on the enterprise data center 502. The DNS resolver 510 can identify the first connector 504(1) and the second connector 504(2) using the entity identifier from the DNS request.

The DNS resolver 510 can be configured to select, determine, or identify at least one connector 504 via which the client 102 is to access the application 506. The DNS resolver 510 can select the connectors 504 based on the metrics. For example, the DNS resolver 510 can select the connectors 504 based on the metrics identified using the entity identifier and the data center identifier. In particular, the DNS resolver 510 can select the connectors 504 based on the number of connections. In some cases, the DNS resolver 510 can be configured to select the connectors 504 based on the throughput. For example, the DNS resolver 510 can select the first connector 504(1) if it has the most throughput.

The broker 512 can be configured to communicate with the PoPs 508. The broker 512 can be configured as an intermediary device or server between the client 102 and the PoPs 508. For instance, when a user transmits a DNS resolution request to access the application 506 executing in the enterprise data center, the broker 512 can be configured to communicate with one or more PoPs 508. In particular, the broker 512 can be configured to transmit, to one or more PoPs 508, instructions to provide a fully qualified domain name (FQDN) to the client 102, which the client 102 can then use to populate the DNS resolution request. Based on the instructions, the broker 512 can be configured to generate a configuration file. The generated configuration file can include the FQDN of the PoP 508 to which the traffic from the client 102 should be routed. As a part of constructing the configuration file, the broker 512 can be configured to transmit instructions to any PoP 508 to identify the FQDN of the PoP 508 with which a connection between the client 102 and the PoP 508 is to be established. The FQDN can be used to provide the name of the customer or the client 102, and the location of the resource or the application 506 corresponding to the connector 504 selected responsive to the DNS resolution request. The generated configuration file can be executed by the client 102 to generate the DNS resolution request.

Upon the DNS resolver resolving the DNS resolution request, the client device can transmit a request to access the application via the selected PoP based on the response to the DNS resolution request. The request to access the application can land on or be routed to a service node of the PoP 508. The service node can be a server or network component of the PoP 508 for serving the end to end user data (e.g., data relating to accessing the application 508). The client 102 can land or connect with the service node of the PoP 508.

Responsive to the service node receiving the request from the client device, the service node can be configured to transmit data to a controller of the PoP 508. The controller can be configured to transmit a message to the connector 504 that identifies, to the connector, 504 an IP address of the service node that received the request from the client device. The connector 504 can then establish a connection with the service node via the IP address of the service node to enable a connection between the client and the application via the service node of the PoP 508.

Figure 6:
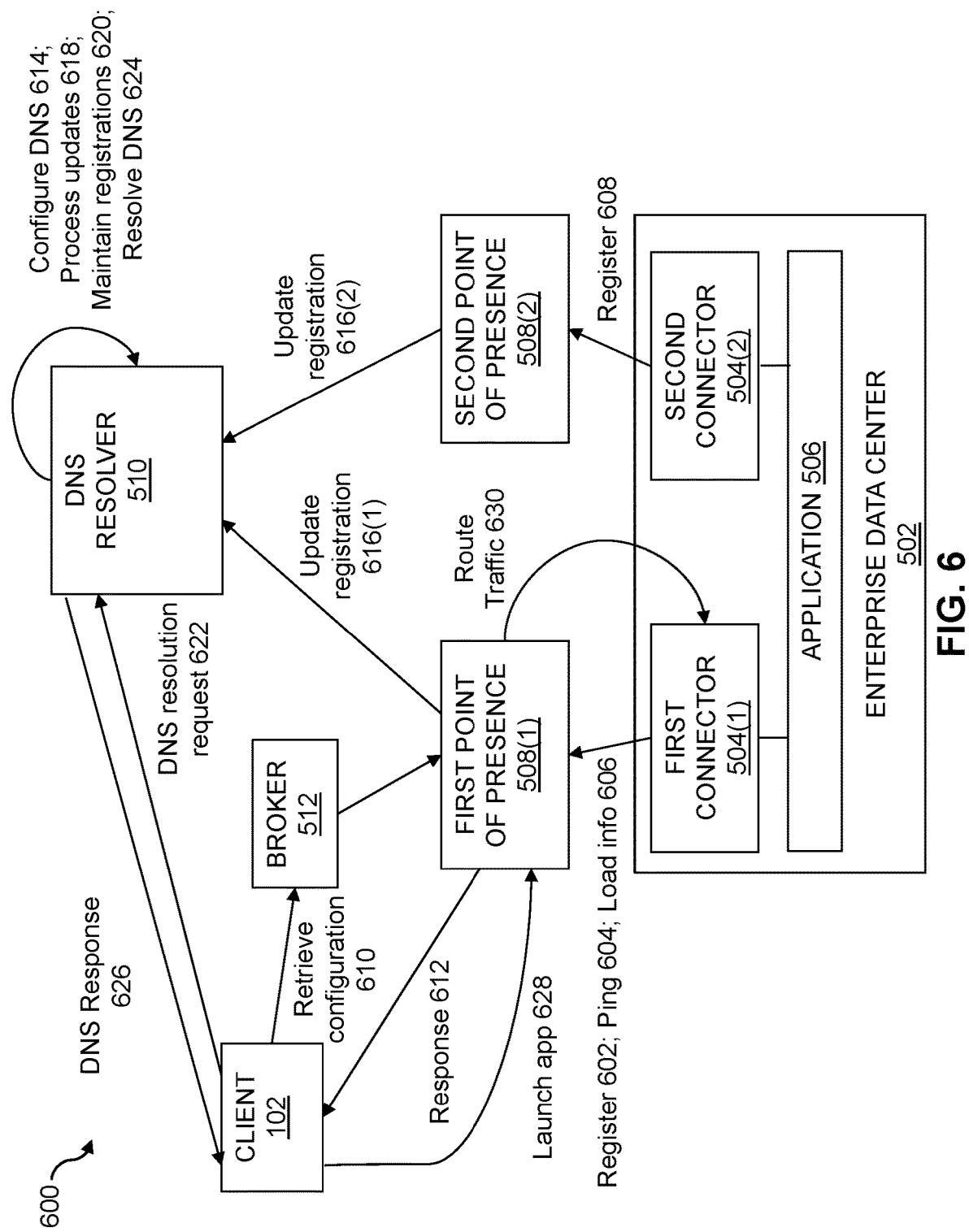
FIG. 6 is a diagram of a workflow for end user connection load balancing, in accordance with one or more embodiments.

Referring now to FIG. 6, FIG. 6 depicts a diagram of a workflow 600 for end user connection load balancing, in accordance with one or more embodiments. For example, the components described in FIGS. 1-5, and/or the DNS resolver 510 detailed above can perform the operations and functionalities of the workflow 600. In brief overview, the first connector 504(1) can register with the first PoP 508(1) (STEP 602). The first connector can ping the first PoP 508(1) (STEP 604). The first connector can transmit loading information to the first PoP 508(1) (STEP 606). The second connector 504(2) can register with the second PoP 508(2) (STEP 608). The client 102 can retrieve a configuration from the first PoP 508(1) (STEP 610). The first PoP 508(1) can transmit a response to the client 102 (STEP 612). The DNS resolver 510 can be configured (STEP 614). The first and second PoPs 508 can update their registration with the DNS resolver 510 (STEP 616). The DNS resolver 510 can process updates (STEP 618). The DNS resolver 510 can maintain registrations (STEP 620). The client 102 can request a DNS resolution (STEP 622). The DNS resolver 510 can resolve the DNS (STEP 624). The DNS resolver 510 can transmit a DNS response to the client 102 (STEP 626). The client can launch an application via the first PoP 508(1) (STEP 628). The first PoP 508(1) can route the client 102 to the first connector 504(1) (STEP 630).

In further detail, the first connector 504(1) can register with the first PoP 508(1) (STEP 602). To register, the first connector 504(1) can transmit registration information, which can include a network identifier (e.g., IP address or port number) of the first connector 504(1), to the PoP 508(1). The connector 504 can register with the PoP 508 closest to its geographical location based on network latencies (e.g., connections between proximate connectors and PoPs experience less latency). For example, the first PoP 508(1) can be registered with the first connector 504(1). The first connector 504(1) can register with the PoP 508(1) as part of configuring a geographically distributed PoP cloud service (e.g., environment 500). The registrations enable the subscribing customers (e.g., client 102) to communicate with the connectors 504 (e.g., connector 504(1) and 504(2)) configured to be the proxy between the firewall protected enterprise resources (e.g., application 506 within the enterprise data center 502)) and the PoPs 508 (e.g., PoP 508(1) and 508(2)).

The first connector 504(1) can ping the first PoP 508(1) (STEP 604). For example, after registering with the PoP 508(1), the first connector 504(1) can establish a connection with the first PoP 508(1). As part of the configuration of the PoP cloud service, the first connector 504(1) can periodically ping or transmit requests to the first PoP 508(1). The ping can include one or more messages to monitor the established connection. The messages can be known as 'keepalive' messages to maintain the connection. The messages enable the DNS resolver 510 to monitor the connection between the first connector 504(1) and the first PoP 508(1). For example, the messages can allow the DNS resolver 510 to detect a connection status between the first connector 504(1) and the first PoP 508(1). The connection status can be indicative of potential connections at the application level (e.g., for the client 102 to access the application 506).

The first connector 504(1) can transmit load information to the first PoP 508(1) (STEP 606). The first connector 504(1) can identify, determine, or identify load information relating to its own network activity. For example, the information can include a connection count or throughput. The first connector 504(1) can provide this information to the first PoP 508(1) for the DNS resolver 510 to identify and select the connectors 504.

The second connector 504(2) can register with the second PoP (e.g., PoP 508(2)) (STEP 608). For example, since the enterprise data center 502 can include multiple connectors 504 register with respective PoPs 508, the connector 504(2) can register with the second PoP 508(2) that is located in a geographic location different from a geographic location of the first PoP 508(1). The second connector 504(2) can ping the second PoP 508(2) to maintain the connection between the second connector 504(2) and the second PoP 508(2), as well as transmit load information to the second PoP 508(2).

The client 102 can retrieve a configuration file from the first PoP 508(1) (STEP 610). When the client 102 requests access to the application 506, the broker 512 can generate a configuration file for the client 102. The broker 512 can generate the configuration file based on the connections between the connectors 504 and the PoPs 508. The configuration file can include a fully qualified domain name (FQDN) of the PoPs 508 to which the network traffic of the client 102 can be routed. The FQDN can be identified or consumed by the client 102. To generate or construct the configuration file, the broker 512 can connect to the PoPs 508. The broker 512 can provide a name associated with the client 102 or a location of the connectors 504 via which the client 102 is to access the application 506. By connecting or accessing the PoPs 508, the broker 512 can acquire, identify, or retrieve the FQDN of the PoPs 508 to which the broker 512 can connect. The broker 512 can include the FQDN in the configuration file. After generating or retrieving the configuration file, the broker 512 can transmit the configuration file to the client 102.

The first PoP 508(1) can transmit a response to the client 102 (STEP 612). For example, responsive to receiving a request to provide or identify its FQDN to the broker 512, the first PoP 508(1) can return a client 102 and application 506 or enterprise data center 502 specific FQDN instead of a global FQDN such as "customername-resourcelocationuiid-global.g.nssvc.net."

The DNS resolver 510 can manage the PoPs 508 (STEP 614). The DNS resolver 510 can maintain or manage data feeds from the PoPs 508. These data feeds can be endpoints via which the DNS resolver 510 can receive or accept data for selecting the PoPs 508 and connectors 504 via which the client 102 is to access the application 506. The data feeds can include network experience data, service availability, and application metrics.

The first and second PoPs 508 can update their registration with the DNS resolver 510 (STEP 616). The PoPs 508 can acquire, identify, or retrieve the registration information from their respective connectors 504 to which they are connected. The PoPs 508 can acquire, identify, or retrieve the registration information the registration information responsive to registration or deregistration of the connectors 504. The registration information can include a list of connectors 504 registered the respective PoP 508. The list can include information about the connectors 504, such as their network addresses, identifiers, names, resource locations, their load statistics, or metrics. The PoPs 508 can send or transmit the registration information to the DNS resolver 510. The PoPs 508 can send or transmit the connector registration information periodically or in a JSON format. The following is one example of registration information for transmission by the PoPs 508:

```
{
    "popId": "az-us-w", //US west POP
        "connectorInfo": [
            {
                "customerName": "<customer-name>",
                "resourceLocation": "<resource-location-uuid>",
                "connectors: [
                    "edgeServerID": "<edgeserver-uuid>",
                    "HDXConnectioncount":
"<currentHDXconnectioncount>",
                            "CurrentThroughput":
"<currentThroughput>"
                ]
        },
        ...
    ]
}
```

The DNS resolver 510 can process, receive, or identify updates from the PoPs 508 (STEP 618). For example, the DNS resolver 510 can be configured with an algorithm to take in, receive, or identify the registration information from the PoPs 508. The DNS resolver 510 can determine a parameter to resolve the DNS resolution request from the client 102 to access the application 506. Based on the feed data, the DNS resolver 510 can identify the least loaded connector 504. For example, for every DNS resolution request from the client 102 for the global endpoint (e.g., global.g.nssvc.net), the DNS resolver 510 can select the least loaded connector 504. The least loaded connector 504 can be defined as the one with least throughput, or in the case of equal throughput, the least number of connections. In some embodiments, the DNS resolver 510 can select the connector 504 based on a weighted average of the load parameters such as throughput and number of connections.

The DNS resolver 510 can maintain registrations (STEP 620). The DNS resolver 510 can store or maintain the registration information that identifies the connections between the connectors 504 and the PoPs 508. Based on the registration information included in the feed data, the DNS resolver 510 can have a global view of the environment 500 that can include the data for all the connectors 504 and to which PoP 508 they are currently registered.

The client 102 can request a DNS resolution (STEP 622). The DNS resolution request can be a request to resolve a DNS query. The DNS resolution request can be a request for a selection of the PoP 508 via which the client 102 is to connect to the connector 504 to access the application 506. The DNS resolution request can include an FQDN of the PoPs 508 to which the client 102 is configured to connect. The DNS resolver 510 can use the customer name and resource location (e.g., name, address, or location of the enterprise data center 502 hosting the application 506) in the FQDN to determine which PoPs 508 the connectors 504 are registered to and which one of the connectors 504 is the least loaded.

The DNS resolver 510 can resolve the DNS resolution request (STEP 624). Based on FQDN included in the DNS resolution request, the DNS resolver 510 identify the specific FQDN of the PoP 508 where the connector 504 is registered for communicating with the client 102. For example, the FQDN can be "az-us-e-global.g.nsvc.net. The user traffic can be directed to the PoP 508 at which the least loaded connector 504 is registered. For example, if the first connector 504(1) is least loaded, the DNS resolver 510 can select or identify a FQDN for PoP 508(1). While resolving the DNS resolution request, the DNS resolver 510 can select a respective connector 504 of the selected PoP 508. For example, the DNS resolver 510 can select the first connector 504(1) corresponding to the first PoP 508(1). By selecting the connector 504, the DNS resolver 510 can prevent load imbalance amongst the connectors 504.

The DNS resolver 510 can transmit a DNS response to the client 102 (STEP 626). The DNS response can include the selected or identified FQDN of the PoP 508 via which the client 102 is to connect to access the selected connector 504. For example, the DNS response can include the FQDN of the PoP 508(1) via which the client 102 is to access the connector 504(1). In another example, the returned FQDN can be "-popa-global.g.nssvc.net".

The client 102 can launch the application 506 via the first PoP 508(1) (STEP 628). To launch the application 506, the client 102 can connect to the first PoP 508(1) to be routed to the least loaded and selected first connector 504(1).

The first PoP 508(1) can route application traffic of the client 102 to the first connector 504(1) (STEP 630). The DNS resolver 510 routes the application traffic of the client 102 to the first connector 504(1) that was identified and selected while resolving the DNS resolution request. By routing the application traffic of the client 102 to the first connector 504(1), the DNS resolver 510 can reduce connection setup latency by eliminating data transfers between POPs 508. It should be noted that as the connectors reside on premises, each connector maintains a connection with the corresponding PoP such that when a DNS request is resolved to a particular server, the server communicates with the PoP and the PoP utilizes the already established connection from the connector to convey, to the connector, that a new connection is waiting on the server by providing the DNS address of that server to the connector. The connector can then connect to the server. In this way, application traffic of the client can be routed to the selected server via the connector and PoP selected responsive to the DNS resolution request.

Referring now to FIG. 7, FIG. 7 depicts a diagram of a method 700 for data linkage and entity resolution of continuous and un-synchronized data streams, in accordance with one or more embodiments. The components described in FIGS. 1-6, and/or the DNS resolver 510 detailed above can perform the operations and functionalities of the method 700. In brief overview, the DNS resolver (e.g., DNS resolver 510) can receive metrics for connectors (e.g., connectors 504) (STEP 702). The DNS resolver can receive a DNS request (STEP 704). The DNS resolver can select connectors based on the metrics (STEP 706). The DNS resolver can transmit responses to DNS requests (STEP 708).

In further detail, the DNS resolver can receive metrics for connectors (STEP 702). The DNS resolver can receive the metrics from the PoPs (e.g., PoPs 508) connected to the connectors. The PoPs can receive the metrics in the messages from the connectors. For example, the DNS resolver 510 can receive metrics for a first connector and a second connector of the enterprise data center (e.g., enterprise data center 502) of an entity. Based on the metrics, the DNS resolver can identify throughput of the connectors 504. In another example, based on the metrics, the DNS resolver can identify or determine a count of connections for the connectors.

The DNS resolver can receive a DNS request (STEP 704). The DNS resolver can receive a DNS request including an entity identifier and a data center identifier. The DNS resolver can receive the DNS request from the client. The client can receive the entity identifier and the enterprise data center identifier responsive to the client requesting access to a resource hosted on the first server and the second server. The client can receive the entity identifier and the enterprise data center identifier from a broker (e.g., broker 512). For example, the entity identifier and the data center identifier can be included in a FQDN, which the client can receive from the broker to provide to the DNS resolver.

The DNS resolver can select connectors based on the metrics (STEP 706). To select the connectors, the DNS resolver can maintain a list of connectors coupled to the PoPs, such as the first PoP or the second PoP. The DNS resolver can maintain the list for the first PoP and the second PoP. The list can include entity identifiers, data center identifiers, and metrics corresponding to the list of connectors. Based on the selected connector coupled to the selected PoP, the DNS resolver can select the PoP via which the client 102 can connect to the selected connector.

The DNS resolver can select a PoP (also known as a server) based on the metrics identified using the entity identifier and the data center identifier. The DNS resolver can identify the first connector and the second connector of the entity using the entity identifier from the DNS request. The first connector can serve as a proxy between the first PoP and resources (e.g., application 506) of the entity (e.g., enterprise data center 502). The second connector can serve as a proxy between the second PoP and the resources of the entity. The first connector can transmit a plurality of messages to maintain a connection with the first PoP. The plurality of messages can include data corresponding to the first set of metrics of the first connector. The data corresponding to the first set of metrics of the first connector can include a first throughput of the first connector or a first count of connections.

The DNS resolver can select a connector based on the first set of metrics and the second metrics. The DNS resolver can select the first set of metrics and the second metrics from the first connector or the second connector. The first connector can be one of a plurality of first connectors coupled to the first PoP. The DNS resolver can receive a respective set of metrics of the plurality of first connectors. The DNS resolver can receive the respective set of metrics from the first PoP. The first connector can establish a connection with the selected PoP based on at least one of the respective set of metrics for the plurality of first connectors.

The DNS resolver can select the connector based on metrics indicative of the throughput of the connectors. The DNS resolver can select the connector from the first connector and the second connector based on a first throughput and a second throughput. The DNS resolver can identify the first throughput of the first connector and the second throughput of the second connector. The DNS resolver can identify the throughputs of the connectors from the metrics received from the PoPs. Based on first throughput and the second throughput, the DNS resolver can select the connector.

The DNS resolver can select the connector based on metrics indicative of a number of connections maintained or managed for the connectors. The DNS resolver can identify a first count of connections for the first connector and a second count of connections for the second connector. The DNS resolver can identify the counts of connections from the metrics received from the PoPs. Based on first count and the second count, the DNS resolver can select the connectors.

The DNS resolver can transmit responses to DNS requests (STEP 708). The DNS resolver can transmit a response to the request identifying the selected PoP. The DNS resolver can generate responses that include the selected PoP to access the selected connector. The DNS resolver can modify the response to include the FQDN or identifier of the PoP and the connector. The DNS resolver can transmit the response to the client such that the client connects to the selected connector via the selected PoP to access the application hosted by the enterprise data center.

In some embodiments, the client can transmit a request to access the application to the PoP responsive to receiving the response to the DNS resolution request. The request to access the application can land on a server of the PoP, which can be referred to as the service node of the PoP for this client. The service node, responsive to receiving the request, can transmit a notification or packets to a controller of the PoP. The controller of the PoP can be the same server that receives messages from the connector 504 including the load information. The controller of the PoP can send a message to the connector 504 via the same communication channel over which it receives the load information, indicating the identity of the service node that received the request from the client. In this way, the connector can communicate with the identified service node and enable a connection between the client and the application via the service node.

In view of the foregoing, it should be appreciated that the systems and methods described herein can provide various technical improvements. One of the technical improvements provided by the present disclosure can include optimizing the connector lookup and the load balancing by utilizing the connector load statistics to determine the least loaded connector, which enables the PoP to respond with a dynamically created FQDN using the customer name and resource location instead of a global FQDN.

Another technical improvement provided by the present disclosure includes avoid having to broadcast (but broadcasts can still be used as a fallback mechanism), which allows for a reduction in the time for the data channel establishment between the user and the connector providing better end user experience.

Another technical improvement provided by the present disclosure includes avoiding the introduction of an additional component (e.g., a shared database, which avoids the increased failure risk associated with adding additional components.

F. EXAMPLE EMBODIMENTS

The following examples pertain to further example embodiments, from which permutations and configurations will be apparent.

Example 1 includes a method. The method includes receiving, by a domain name system (DNS) resolver, metrics for a first connector and a second connector of a data center of an entity. The method includes receiving, by the DNS resolver, from a client, a DNS request including an entity identifier and a data center identifier. The method includes transmitting, by the DNS resolver to the client, a response to the request identifying a server selected based on the metrics identified using the entity identifier and the data center identifier.

Example 2 includes the subject matter of Example 1, further comprising selecting, by the DNS resolver, from the first connector or the second connector, a connector based on the first set of metrics and the second set of metrics. In some embodiments, the DNS resolver selects the server based on the selected connector coupled to the selected server.

Example 3 includes the subject matter of any of Examples 1 and 2, wherein the first connector is one of a plurality of first connectors coupled to the first server. In some embodiments, the method further includes receiving, by the DNS resolver from the first server, a respective set of metrics of the plurality of first connectors. In some embodiments, the first connector establishes a connection with the selected server based on at least one of the respective set of metrics for the plurality of first connectors.

Example 4 includes the subject matter of any of Examples 1 through 3, wherein selecting the connector further includes identifying, by the DNS resolver, a first throughput of the first connector and a second throughput of the second connector. In some embodiments, the selecting the connector further includes identifying, by the DNS resolver, a first count of connections for the first connector and a second count of connections for the second connector. In some embodiments, the selecting the connector further includes selecting the connector from the first connector and the second connector based on the first throughput and the second throughput, or the first count and the second count.

Example 5 includes the subject matter of any of Examples 1 through 4, wherein the entity identifier and the data center identifier are received by the client responsive to the client requesting access to a resource hosted on the first server and the second server.

Example 6 includes the subject matter of any of Examples 1 through 5, further comprising identifying, by the DNS resolver, the first connector and the second connector of the entity using the entity identifier from the DNS request.

Example 7 includes the subject matter of any of Examples 1 through 6, wherein the first connector serves as a proxy between the first server and resources of the entity, and wherein the second connector serves as a proxy between the second server and the resources of the entity.

Example 8 includes the subject matter of any of Examples 1 through 7, wherein the first connector is configured to transmit a plurality of messages to maintain a connection with the first server, the plurality of messages including data corresponding to the first set of metrics of the first connector.

Example 9 includes the subject matter of any of Examples 1 through 8, wherein the data corresponding to the first set of metrics of the first connector includes a first throughput of the first connector or a first count of connections.

Example 10 includes the subject matter of any of Examples 1 through 9, further comprising maintaining, by the DNS resolver, for the first server and the second server, a list of connectors coupled to the first server or the second server, the list including entity identifiers, data center identifiers and metrics corresponding to the list of connectors.

Example 11 includes a system. The system includes a domain name system (DNS) resolver. The DNS resolver is configured to receive metrics for a first connector and a second connector of a data center of an entity. The DNS resolver is configured to receive, from a client, a DNS request including an entity identifier and a data center identifier. The DNS resolver is configured to transmit, to the client, a response to the request identifying a server selected based on the metrics identified using the entity identifier and the data center identifier.

Example 12 includes the subject matter of Example 11, wherein the DNS resolver is further configured to select, from the first connector or the second connector, a connector based on the first set of metrics and the second metrics. In some embodiments, the DNS resolver selects the server based on the selected connector coupled to the selected server.

Example 13 includes the subject matter of any of Examples 11 and 12, wherein the first connector is one of a plurality of first connectors coupled to the first server. In some embodiments, the DNS resolver is further configured to receive, from the first server, a respective set of metrics of the plurality of first connectors. In some embodiments, the first connector establishes a connection with the selected server based on at least one of the respective set of metrics for the plurality of first connectors.

Example 14 includes the subject matter of any of Examples 11 through 13, wherein selecting the connector includes identifying a first throughput of the first connector and a second throughput of the second connector. In some embodiments, selecting the connector includes identifying a first count of connections for the first connector and a second count of connections for the second connector. In some embodiments, selecting the connector includes selecting the connector from the first connector and the second connector based on the first throughput and the second throughput, or the first count and the second count.

Example 15 includes the subject matter of any of Examples 11 through 14, wherein the entity identifier and the data center identifier are received by the client responsive to the client requesting access to a resource hosted on the first server and the second server.

Example 16 includes the subject matter of any of Examples 11 through 15, wherein the DNS resolver is further configured to identify the first connector and the second connector of the entity using the entity identifier from the DNS request.

Example 17 includes the subject matter of any of Examples 11 through 16, wherein the first connector serves as a proxy between the first server and resources of the entity. In some embodiments, the second connector serves as a proxy between the second server and the resources of the entity.

Example 18 includes the subject matter of any of Examples 11 through 17, wherein the first connector is configured to transmit a plurality of messages to maintain a connection with the first server, the plurality of messages including data corresponding to the first set of metrics of the first connector, wherein the data corresponding to the first set of metrics of the first connector includes a first throughput of the first connector or a first count of connections.

Example 19 includes the subject matter of any of Examples 11 through 18, wherein the DNS resolver is further configured to maintain, for the first server and the second server, a list of connectors coupled to the first server or the second server, the list including entity identifiers, data center identifiers and metrics corresponding to the list of connectors.

Example 20 includes a non-transitory computer readable medium storing program instructions that, when executed by one or more processors, cause the one or more processors to receive metrics for a first connector and a second connector of a data center of an entity. The one or more processors can receive, from a client, a domain name system (DNS) request including an entity identifier and a data center identifier. The one or more processors can transmit, to the client, a response to the request identifying a server selected based on the metrics identified using the entity identifier and the data center identifier.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
receiving, by a domain name system (DNS) resolver, metrics for a first connector and a second connector, the first connector intermediary to a first point of presence (POP) and a data center of an entity, and the second connector intermediary to a second POP and the data center;
receiving, by the DNS resolver, from a client, a DNS request comprising a fully-qualified domain name (FQDN) including an entity identifier and a data center identifier, the entity identifier and data center identifier included in a configuration file obtained by the client from the first POP, the client using the entity identifier and the data center identifier to generate the DNS request received by the DNS resolver; and
transmitting, by the DNS resolver to the client, a response to the DNS request identifying one of the first POP or the second POP selected based on the metrics of the first connector and the second connector identified using the entity identifier and the data center identifier included in the FQDN, the client establishing a connection between the client and the first POP or second POP based on the response.

2. The method of claim 1, further comprising:
selecting, by the DNS resolver, from the first connector or the second connector, a connector based on a first set of metrics of the first connector and a second set of metrics of the second connector; and
wherein the DNS resolver selects the first POP or the second POP based on the selected connector coupled to the selected POP.

3. The method of claim 2, wherein the first connector is one of a plurality of first connectors coupled to the first POP, the method further comprising:
receiving, by the DNS resolver from the first POP, a respective set of metrics of the plurality of first connectors; and
wherein the first connector establishes a connection with the selected POP based on at least one of the respective set of metrics for the plurality of first connectors.

4. The method of claim 2, wherein selecting the connector comprises:
identifying, by the DNS resolver, a first throughput of the first connector and a second throughput of the second connector;
identifying, by the DNS resolver, a first count of connections for the first connector and a second count of connections for the second connector; and
selecting the connector from the first connector and the second connector based on the first throughput and the second throughput, or the first count and the second count.

5. The method of claim 1, wherein the entity identifier and the data center identifier are received by the client responsive to the client requesting, from the first POP, access to a resource hosted on the data center.

6. The method of claim 1, further comprising identifying, by the DNS resolver, the first connector and the second connector of the entity using the entity identifier from the DNS request.

7. The method of claim 1, wherein the first connector serves as a proxy between the first POP and resources of the entity accessible via the data center, and wherein the second connector serves as a proxy between the second POP and the resources of the entity accessible via the data center.

8. The method of claim 1, wherein the first connector is configured to transmit a plurality of messages to maintain a connection with the first POP, the plurality of messages including data corresponding to a first set of metrics of the first connector.

9. The method of claim 8, wherein the data corresponding to the first set of metrics of the first connector includes a first throughput of the first connector or a first count of connections.

10. The method of claim 1, further comprising maintaining, by the DNS resolver, for the first POP and the second POP, a list of connectors coupled to the first POP or the second POP, the list including entity identifiers, data center identifiers and metrics corresponding to the list of connectors.

11. A system comprising:
a domain name system (DNS) resolver configured to:
receive metrics for a first connector and a second connector, the first connector intermediary to a first point of presence (POP) and a data center of an entity, and the second connector intermediary to a second POP and the data center;
receive, from a client, a DNS request comprising a fully-qualified domain name (FQDN) including an entity identifier and a data center identifier, the entity identifier and data center identifier included in a configuration file obtained by the client from the first POP, the client using the entity identifier and the data center identifier to generate the DNS request received by the DNS resolver; and
transmit, to the client, a response to the DNS request identifying one of the first POP or the second POP selected based on the metrics of the first connector and the second connector identified using the entity identifier and the data center identifier included in the FQDN, the client establishing a connection between the client and the first POP or second POP based on the response.

12. The system of claim 11, wherein the DNS resolver is further configured to:
select, from the first connector or the second connector, a connector based on a first set of metrics of the first connector and a second set of metrics of the second connector; and
wherein the DNS resolver selects the first POP or the second POP based on the selected connector coupled to the selected POP.

13. The system of claim 12, wherein the first connector is one of a plurality of first connectors coupled to the first POP, and wherein the DNS resolver is further configured to:
receive, from the first POP, a respective set of metrics of the plurality of first connectors; and
wherein the first connector establishes a connection with the selected POP based on at least one of the respective set of metrics for the plurality of first connectors.

14. The system of claim 12, wherein selecting the connector comprises:
identifying a first throughput of the first connector and a second throughput of the second connector;
identifying a first count of connections for the first connector and a second count of connections for the second connector; and
selecting the connector from the first connector and the second connector based on the first throughput and the second throughput, or the first count and the second count.

15. The system of claim 11, wherein the entity identifier and the data center identifier are received by the client responsive to the client requesting, from the first POP, access to a resource hosted on the data center.

16. The system of claim 11, wherein the DNS resolver is further configured to identify the first connector and the second connector of the entity using the entity identifier from the DNS request.

17. The system of claim 11, wherein the first connector serves as a proxy between the first POP and resources of the entity accessible via the data center, and wherein the second connector serves as a proxy between the second POP and the resources of the entity accessible via the data center.

18. The system of claim 11, wherein the first connector is configured to transmit a plurality of messages to maintain a connection with the first POP, the plurality of messages including data corresponding to a first set of metrics of the first connector, wherein the data corresponding to the first set of metrics of the first connector includes a first throughput of the first connector or a first count of connections.

19. The system of claim 11, wherein the DNS resolver is further configured to maintain, for the first POP and the second POP, a list of connectors coupled to the first POP or the second POP, the list including entity identifiers, data center identifiers and metrics corresponding to the list of connectors.

20. A non-transitory computer-readable medium storing instructions that, when executed by one or more processors, cause the one or more processors to:
- receive metrics for a first connector and a second connector, the first connector intermediary to a first point of presence (POP) and a data center of an entity, and the second connector intermediary to a second POP and the data center;
- receive, from a client, a domain name system (DNS) request comprising a fully-qualified domain name (FQDN) including an entity identifier and a data center identifier, the entity identifier and the data center identifier included in a configuration file obtained by the client from the first POP, the client using the entity identifier and the data center identifier to generate the DNS request received by the DNS resolver; and
- transmit, to the client, a response to the DNS request identifying one of the first POP or the second POP selected based on the metrics of the first connector and the second connector identified using the entity identifier and the data center identifier included in the FQDN, the client establishing a connection between the client and the first POP or second POP based on the response.

\* \* \* \* \*